2,842,539
POLYAZO DYESTUFFS

Hans-Rudolf Byland, Riehen, near Basel, Switzerland, assignor, by mesne assignments, to Saul & Co., Newark, N. J., as nominee of Fidelity Union Trust Company, executive trustee under Sandoz Trust No Drawing. Application October 7, 1955
Serial No. 539,258

Claims priority, application Switzerland October 20, 1952

6 Claims. (Cl. 260—168)

The present application relates to new polyazo dyestuffs and represents a further development of the invention described in application Ser. No. 494,295, filed March 14, 1955, which is a continuation in part of the application Ser. No. 385,671, filed October 12, 1953, now abandoned.

It has been found that valuable polyazo dyestuffs can be obtained by coupling 1 mol of the tetrazo compound of a 4.4′-diamino-1.1′-diphenyl of the general formula

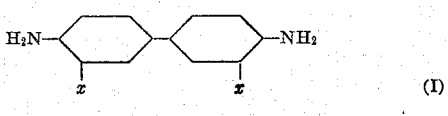

wherein $x$ represents —OH, —OCH$_3$, —OC$_2$H$_5$, —OCH$_2$.COOH or —COOH, with 2 mols of an aminoazo compound of the general formula

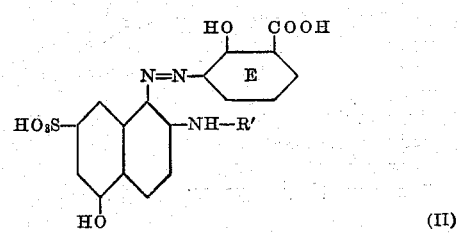

wherein R′ represents alkyl, hydroxyalkyl, alkoxyalkyl, cycloalkyl, aralkyl or aryl, and the nucleus E may carry further substituents commonly present in azo dyestuffs, or by coupling 1 mol of the first named component simultaneously or in either order with 1 mol of an aminoazo compound of this type and 1 mol of a different aminoazo compound of the same general formula, or in either order with 1 mol of an aminoazo compound of this type and 1 mol of any other azo component containing one or more groups capable of entering into complex combination with metal.

The 4.4′-diamino-1.1′-diphenyls of general Formula I which are suitable for the preparation of the polyazo dyestuffs according to the present invention are 4.4′-diamino-3.3′-dihydroxy-1.1′-diphenyl, 4.4′-diamino-3.3′-dimethoxy-1.1′-diphenyl, 4.4′-diamino-3.3′-diethoxy-1.1′-diphenyl, 4.4′-diamino-3.3′-dicarboxymethoxy-1.1′-diphenyl and 4.4′ - diamino - 1.1′ - diphenyl - 3.3′ - dicarboxylic acid. Preferred 4.4′-diamino-1.1′-diphenyls are 4.4′-diamino-3.3′-dimethoxy-1.1′-diphenyl and 4.4′-diamino-1.1′-diphenyl-3.3′-dicarboxylic acid.

The aminoazo compounds of general Formula II are produced by coupling diazotized 2-amino-1-hydroxybenzene-6-carboxylic acids in an acid medium with derivatives of 2-amino-5-hydroxynaphthalene-7-sulfonic acid substituted on the nitrogen atom. Suitable 2-amino-1-hydroxybenzene-6-carboxylic acids are, for example, 2-amino - 1 - hydroxybenzene - 6 - carboxylic acid itself, 2 - amino - 1 hydroxy - 6 - carboxybenzene - 4 - sulfonic acid, 2 - amino - 1 hydroxy - 4 - methylsulfonylbenzene-6 - carboxylic acid, 2 - amino - 1 - hydroxy - 6 - carboxybenzene-4-sulfonic acid amide and its derivatives methylated, ethylated, dimethylated and diethylated on the nitrogen atom of the sulfamide group, 2-amino-1 - hydroxy - 6 - carboxybenzene - 4 - sulfonic acid-phenylamide, its compounds halogenated, alkylated, alkoxylated on the nucleus of the phenylamide group, and further derivatives substituted on the nucleus of the phenylamide group such as the 2-amino-1-hydroxy-6-carboxybenzene - 4 - sulfonic acid - (3′ - carboxy - 4′ - hydroxy)-phenylamide, also 2-amino-1-hydroxy-4-nitrobenzene - 6 - carboxylic acid and 2 - amino - 1 - hydroxy-4 - chlorobenzene - 6 - carboxylic acid. As substituents on the nitrogen atom of the 2-amino-5-hydroxyphthalene-7-sulfonic acid those primarily suitable are alkyl and cycloalkyl radicals, for example methyl, ethyl, propyl, hydroxyethyl and cyclohexyl, mononuclear aryl radicals such as phenyl, (2′- or 3′- or 4′-methyl)-phenyl, (3′- or 4′ - chloro) - phenyl, (4′ - amino) - phenyl, (4′ - carboxy) - phenyl, (3′ - carboxy - 4′ - hydroxy) - phenyl, (3′- or 4′ - sulfo) - phenyl, (3′- or 4′ - methylsulfonyl)-phenyl, (3′- or 4′ - sulfamido) - phenyl, and also binuclear aryl radicals such as (4″-amino)-1′,1″-diphenyl and aralkyl radicals such as benzyl. A preferred substituent on the nitrogen atom of the 2-amino-5-hydroxynaphthalene - 7 - sulfonic acid is phenyl and substituted phenyl as defined above.

The new polyazo dyestuffs may be prepared with a symmetrical or an asymmetrical structure. For the production of asymmetrical products the tetrazotized 4.4′-diamino-1.1′-diphenyl of Formula I is coupled with e. g. two different aminoazo compounds of general Formula II.

It is also possible, however, to arrive at asymmetrical polyazo dyestuffs by coupling 1 mol of tetrazotized 4.4′-diamino-1.1′-diphenyl of Formula I with 1 mol of an aminoazo compound of Formula II and 1 mol of any other azo component containing one or more groups capable of entering into complex combination with metal. Eminently suitable azo components of this type are for example 1-hydroxybenzene-2-carboxylic acid, 1-hydroxy-6 - methylbenzene - 2 - carboxylic acid, 1 - hydroxynaphthalene - 2 - carboxylic acid, 2 - hydroxynaphthalene - 3 - carboxylic acid, 1 - hydroxynaphthalene - 4-sulfonic acid, 1 - hydroxynaphthalene - 4 - sulfonic acid amide, 2 - hydroxynaphthalene, 2 - hydroxynaphthalene - 4- or -6- or -7- or -8 - sulfonic acid, the corresponding sulfonic acid amides and methylsulfones, 1- or 2 - amino - 5 - hydroxynaphthalene - 7-sulfonic acid, 1- or 2-phenylamino-5-hydroxynaphthalene-7-sulfonic acid, 2-methylamine- or 2-ethylamino-5-hydroxynaphthalene - 7 - sulfonic acid, 2-(4′-hydroxy-3′ - carboxy) - phenylamino - 5 - hydroxynaphthalene - 7-sulfonic acid, 2 - phenylamino - 5 - hydroxynaphthalene - 7.4′ - disulfonic acid, 2 - acetylamino- or 2-benzoylamino - 5 - hydroxynaphthalene - 7 - sulfonic acid, 2 - amino- or 2 - benzoylamino - 8 - hydroxynaphthalene - 6 - sulfonic acid, 2 - methylamino- or 2 - hydroxyethylamino - 8 - hydroxynaphthalene - 6 - sulfonic acid, 1 - amino - 8 - hydroxynaphthalene - 4 -sulfonic acid, 1 - amino - 8 -hydroxynaphthalene - 2.4 - disulfonic acid and 1-amino- or 2-butylamino-8-hydroxynaphthalene-3.6-disulfonic acid, also compounds which couple in the adjacent position to an enolizable keto group, for example 5-pyrazolones, acyl acetic acid amides, acyl acetic acid aryl amides, acyl acetic acid alkyl amides, malonic acid derivatives, barbituric acid derivatives, acetyl acetone, benzoyl acetone, 4-hydroxy-1-alkyl-quinolones and dihydroxyquinoline.

Examples of 5-pyrazolones which which merit special mention are 3-methyl-5-pyrazolone, 1-phenyl-3-methyl-5-pyrazolone, 1-phenyl-3-methyl-5-pyrazolone-3'- or 4'-sulfonic acid amide, 1-(3'- or 4'-methylsulfonyl)-phenyl-3-methyl-5-pyrazolone, 1-(3'- or 4'-nitro)-phenyl-3-methyl - 5 - pyrazolone, 1 - (3' - or 4' - chloro) - phenyl-3-methyl-5-pyrazolone and 1-(2', 5'-dichloro)-phenyl-3-methyl-5-pyrazolone. Particularly important, however, are the acyl acetic acid aryl amides, especially acetoacetylaminobenzene and its derivatives substituted on the benzene atom by halogen atoms, amino, nitro, sulfonic acid, alkylsulfonyl, sulfonic acid amide, carboxylic acid and/or azo groups, also 1-acetoacetylaminonaphthalenes and 2-acetoacetylaminonaphthalenes which may be further substituted, the 1-acetoacetylaminonaphthalene-mono- and disulfonic acids and the 2-acetoacetylaminonaphthalene-mono- and disulfonic acids.

The coupling of 1 mol of the tetrazo compound of the 4.4'-diamino-1.1'-diphenyl of Formula I with 2 mols of the aminoazo compound of Formula II to give symmetrical dyestuffs is conducted simultaneously. When asymmetrical dyestuffs are to be produced, the tetrazo compound of the 4.4'-diamino-1.1'-diphenyl of Formula I may either be coupled first with 1 mol of an aminoazo compound of Formula II and then with 1 mol of an aminoazo compound of Formula II different from the former, or it may be combined first with 1 mol of an aminoazo compound of Formula II and then with 1 mol of any other azo component, in which case the latter may also be coupled in the first instance. It is also possible to obtain valuable products by simultaneous coupling of the tetrazo compound with a mixture of two different aminoazo compounds of Formula II. The first coupling reaction usually takes place fairly rapidly and is carried out preferably in a sodium carbonate alkaline medium. The resulting intermediate compound is either isolated or used further in solution, without special preparation. In order to accelerate the second coupling reaction it is of advantage to add an organic tertiary base to the reaction solution, e. g. pyridine, quinoline or a technical mixture of pyridine bases. The polyazo dyestuffs thus formed are salted out from the reaction solution if necessary, and are then filtered off and dried.

The dyestuffs are readily soluble in water and are applicable by the one-bath and aftercoppering processes on cotton and fibres of regenerated cellulose in navy blue to black shades of excellent fastness properties. They correspond to the general formula

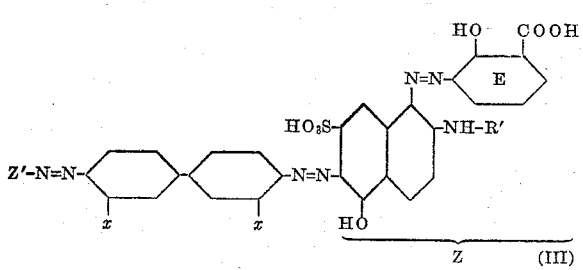

wherein $x$, R' and E have the above-recited significances, and wherein the symbol Z' stands for the radical of a coupling component selected from those corresponding to the formula Z and those corresponding to any other composition and containing one or more groups capable of entering into complex combination with metal. Preferred significances of the symbol $x$ are —$OCH_3$ and —COOH, of the symbol R' phenyl and substituted phenyl radicals.

Aftertreatment of the dyeings with a polyalkylene polyamine in the presence of a copper salt is particularly valuable.

The invention is illustrated by the following examples; the parts specified therein are by weight and the temperatures in degrees centigrade. The products listed in the table are equal in value to those described in the extended examples; they are enumerated in tabular form solely in order to save space.

EXAMPLE 1

24.4 parts of 4.4'-diamino-3.3'-dimethoxy-1.1'-diphenyl are tetrazotized in 150 parts of water and 150 parts of ice. To the tetrazo solution at 0–2° is added an alkaline solution of 55.9 parts of the monoazo compound obtained by acid coupling of diazotized 2-amino-1-hydroxy-6-carboxy-benzene-4-sulfonic acid with 2-phenylamino-5-hydroxynaphthalene-7-sulfonic acid and 10 parts of sodium carbonate in 1000 parts of water. Upon the addition of a solution of 50 parts of sodium carbonate in 250 parts of water to the reaction mass, the one-sided coupling reaction is effected in a short time and the intermediate compound so formed completely precipitated. As soon as the tetrazo compound has entirely disappeared, the reaction mass is combined with a solution of 15.2 parts of 2-hydroxynaphthalene, 4 parts of sodium hydroxide and 300 parts of water. After several hours' agitation the formation of the trisazo dyestuff is completed; it is precipitated from the coupling mass by means of sodium chloride and subsequently filtered off. The dyestuff is purified by re-dissolving, and again precipitated, filtered off and finally dried. It is a dark powder which dissolves in water with a dark blue colouration and dyes cotton and fibres of regenerated cellulose in navy blue shades. The dyeings possess very good fastness to washing and perspiration and excellent fastness to light when treated with copper sulfate in the course of a one- or two-bath process.

The new trisazo dyestuff corresponds to the formula

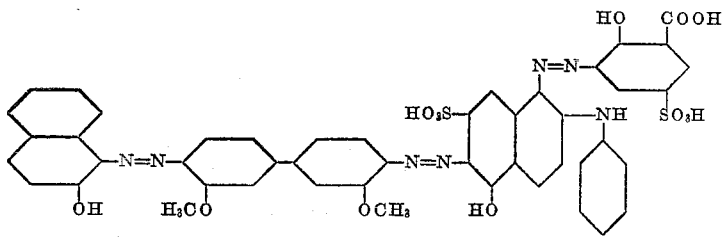

EXAMPLE 2

33.2 parts of 4.4' - diamino-3.3'-dicarboxymethoxy-1.1'-diphenyl are tetrazotized in 150 parts of water and 150 parts of ice. To the tetrazo solution at 0–2° is given a solution of 31.5 parts of 1-phenylamino-8-hydroxynaphthalene-4-sulfonic acid and 10 parts of sodium bicarbonate in 600 parts of water. Then 68 parts of solid sodium carbonate are strewn into the coupling mass in small portions. After prolonged agitation the intermediate compound is completely formed and the tetrazo compound disappears. To the suspension of the intermediate compound there is added a solution of 55.9 parts of the monoazo compound obtained by acid coupling of diazotized 2 - amino - 1 - hydroxy-6-carboxybenzene-4-sulfonic acid with 2-phenylamino-5-hydroxynaphthalene-7-sulfonic acid, 40 parts of sodium carbonate and 100 parts of pyridine in 1000 parts of water. After several hours' agitation at 0–2° the formation of the trisazo dyestuff is completed; it is precipitated from the coupling mass by means of sodium chloride and filtered off. The dyestuff is purified by redissolving, and is again precipitated, filtered off and finally dried. It is obtained in the form of a dark powder which dissolves in water with a blue colouration and dyes cotton and fibers of regenerated cellulose in blue-grey shades. On aftertreatment with copper sulfate, applied by a one- or two-bath process, the dyeings become very fast to washing, perspiration and light.

The new trisazo dyestuff corresponds to the formula solution of 17.7 parts of acetoacetylaminobenzene in 200 parts of water is added to the tetrazo solution; then 68 parts of solid sodium bicarbonate are strewn into it in small portions. After several hours' agitation at 0–2° the formation of the intermediate compound is completed. To the solution of the intermediate compound is added an ice-cold solution of 55.9 parts of the monoazo compound obtained by acid coupling of diazotized 2-amino-1-hydroxy-6-carboxybenzene-4-sulfonic acid with 2-phenylamino-5-hydroxynaphthalene-7-sulfonic acid in 400 parts of ammonia 25%, 200 parts of pyridine and 600 parts of water. The trisazo dyestuff thus formed is completely precipitated and is then filtered off. It is purified by re-

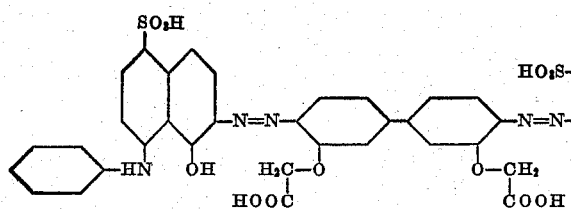

EXAMPLE 3

24.4 parts of 4.4'-diamino-3.3'-dimethoxy-1.1'-diphenyl are tetrazotized in 150 parts of water and 150 parts of ice. The tetrazo solution in run into a solution of 111.8 parts of the monoazo compound obtained by acid coupling of diazotized 2-amino-1-hydroxy-6-carboxybenzene-4-sulfonic acid with 2-phenylamino-5-hydroxynaphthalene-7-sulfonic acid, 300 parts of ammonia 25% and 150 parts of water, in which solution also pyridine is present. The tetrakisazo dyestuff thus formed is precipitated from the coupling mass by means of sodium chloride and then filtered off. It is purified by redissolving, and again precipitated, filtered off and finally dried. The dyestuff is a dark powder which dissolves in water to give blue-coloured solutions and dyes cotton and fibres of regenerated cellulose in navy blue shades. The aftercoppered dyeings possess outstanding fastness properties.

The new tetrakisazo dyestuff correponds to the formula dissolving, and again precipitated, filtered off and finally dried. The dyestuff is a dark powder giving violet-red aqueous solutions, and dyes cotton and fibres of regenerated cellulose in violet-red shades. On aftertreatment with copper salts in a one- or two-bath process, neutral grey shades fast to washing, perspiration and light are obtained.

The new trisazo dyestuff corresponds to the formula

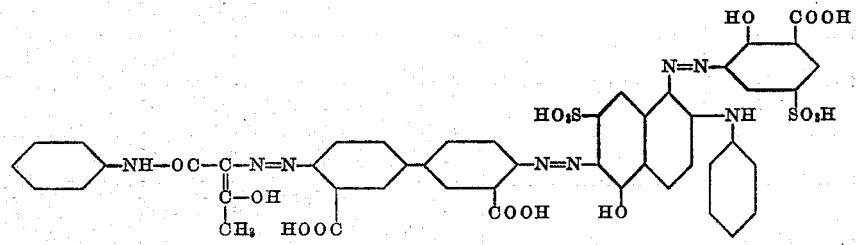

Further examples are noted in the following table. The coupling reactions of the 4.4'-diamino-1.1'-diphenyl of general formula I with the two azo components are carried out in accordance with one of the operating procedures described in Examples 1 to 4. The first coupling reaction is conducted preferably in a sodium carbonate alkaline medium; the second may be effected with an addition of, for example, pyridine, quinoline or a technical mixture of pyridine bases. When the two coupling reactions are conducted simultaneously, it is of advantage

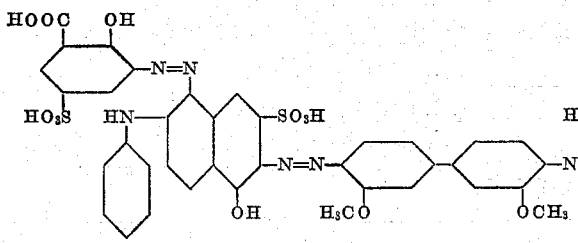

EXAMPLE 4

27.2 parts of 4.4'-diamino-1.1'-diphenyl-3.3'-dicarboxylic acid are tetrazotized in 250 parts of water. A neutral to add an organic tertiary base to the coupling mass at the start of the operation, in order to accelerate the reaction.

Table

| (1) Ex. No. | (2) 4.4'-diamino-1.1'-diphenyl (I) | (3) Aminoazo compound (II) | (4) Second aminoazo compound | (5) Shade of after-coppered dyeings on cotton |
|---|---|---|---|---|
| 5 | 4.4'-diamino-3.3'-dihydroxy-1.1'-diphenyl. | 1-(2'-hydroxy-3'-carboxy)-phenylazo-2-phenylamino-5-hydroxynaphthalene-7.5'-disulfonic acid. | 1-(2'-hydroxy-3'-carboxy)-phenylazo-2-phenylamino-5-hydroxynaphthalene-7.5'-disulfonic acid. | Navy blue. |
| 6 | 4.4'-diamino-3.3'-dimethoxy-1.1'-diphenyl. | ___do___ | 2-hydroxynaphthalene-3-carboxylic acid. | Do. |
| 7 | ___do___ | ___do___ | 1-hydroxy-4-methylbenzene. | Black. |
| 8 | ___do___ | ___do___ | 2-hydroxynaphthalene-4-sulfonic acid. | Navy blue. |
| 9 | ___do___ | ___do___ | 2-hydroxynaphthalene-4-sulfonic acid amide. | Do. |
| 10 | ___do___ | 1-(2'-hydroxy-3'-carboxy-5'-methylsulfonyl)-phenylazo-2-phenylamino-5-hydroxynaphthalene-7-sulfonic acid. | 2-[4'-(4''-amino)-phenyl]-phenylamino-5-hydroxynaphthalene-7-sulfonic acid. | Blue grey. |
| 11 | ___do___ | 1-(2'-hydroxy-3'-carboxy-5'-sulfamido)-phenylazo-2-phenylamino-5-hydroxynaphthalene-7-sulfonic acid. | 2-[4'-(4''-amino)-phenyl]-phenylamino-8-hydroxynaphthalene-6-sulfonic acid. | Reddish grey. |
| 12 | ___do___ | 1-(2'-hydroxy-3'-carboxy)-phenylazo-2-(4'-sulfo)-phenylamino-5-hydroxynaphthalene-7-sulfonic acid. | 2-[4'-(4''-amino)-phenyl]-phenylamino-5-hydroxynaphthalene-7.3''-disulfonic acid. | Blue-grey. |
| 13 | ___do___ | 1-(2'-hydroxy-3'-carboxy)-phenylazo-2-phenylamino-5-hydroxynaphthalene-7.5'-disulfonic acid. | 2-(4'-methyl)-phenylamino-8-hydroxynaphthalene-6-sulfonic acid. | Reddish grey. |
| 14 | ___do___ | ___do___ | 1-phenylamino-8-hydroxynaphthalene-4-sulfonic acid. | Blue-grey. |
| 15 | 4.4'-diamino-1.1'-diphenyl-3.3'-dicarboxylic acid. | ___do___ | 1-(2'-hydroxy-3'-carboxy)-phenylazo-2-phenylamino-5-hydroxynaphthalene-7.5'-disulfonic acid. | Navy blue. |
| 16 | ___do___ | ___do___ | 1-phenylamino-8-hydroxynaphthalene-4-sulfonic acid. | Blue-grey. |
| 17 | 4.4'-diamino-3.3'-dimethoxy-1.1'-diphenyl. | 1-(2'-hydroxy-3'-carboxy-5'-nitro)-phenylazo-2-phenylamino-5-hydroxynaphthalene-7-sulfonic acid. | 1-hydroxynaphthalene-4-sulfonic acid. | Navy blue. |
| 18 | ___do___ | 1-(2'-hydroxy-3'-carboxy-5'-sulfo)-phenylazo-2-(3'-carboxy-4'-hydroxy)-phenylamino-5-hydroxynaphthalene-7-sulfonic acid. | 2-hydroxynaphthalene. | Do. |
| 19 | ___do___ | ___do___ | 2-[4'-(4''-amino)-phenyl]-phenylamino-5-hydroxynaphthalene-7-sulfonic acid. | Blue-grey. |
| 20 | ___do___ | 1-(2'-hydroxy-3'-carboxy)-phenylazo-2-methylamino-5-hydroxynaphthalene-7.5'-disulfonic acid. | 2-hydroxynaphthalene. | Navy blue. |
| 21 | ___do___ | 1-(2'-hydroxy-3'-carboxy)-phenylazo-2-hydroxyethylamino-5-hydroxynaphthalene-7.5'-disulfonic acid. | ___do___ | Do. |
| 22 | 4.4'-diamino-3.3'-diethoxy-1.1'-diphenyl. | 1-(2'-hydroxy-3'-carboxy)-phenylazo-2-propylamino-5-hydroxynaphthalene-7.5'-disulfonic acid. | 1-phenylamino-8-hydroxynaphthalene-4-sulfonic acid. | Blue-grey. |
| 23 | 4.4'-diamino-3.3'-dimethoxy-1.1'-diphenyl. | 1-(2'-hydroxy-3'-carboxy)-phenylazo-2-cyclohexylamino-5-hydroxynaphthalene-7.5'-disulfonic acid. | 2-hydroxynaphthalene. | Navy blue. |
| 24 | ___do___ | 1-(2'-hydroxy-3'-carboxy)-phenylazo-2-benzylamino-5-hydroxynaphthalene-7.5'-disulfonic acid. | ___do___ | Do. |
| 25 | ___do___ | 1-(2'-hydroxy-3'-carboxy-5'-sulfo)-phenylazo-2-(3'-sulfamido)-phenylamino-5-hydroxynaphthalene-7-sulfonic acid. | 1-(2'-hydroxy-3'-carboxy-5'-sulfo)-phenylazo-2-(3'-sulfamido)-phenylamino-5-hydroxynaphthalene-7-sulfonic acid. | Do. |
| 26 | 4.4'-diamino-1.1'-diphenyl-3.3'-dicarboxylic acid. | ___do___ | 1-phenyl-3-methyl-5-pyrazolone. | Black. |
| 27 | ___do___ | 1-(2'-hydroxy-3'-carboxy-5'-nitro)-phenylazo-2-phenylamino-5-hydroxynaphthalene-7-sulfonic acid. | Acetoacetylaminobenzene. | Do. |
| 28 | ___do___ | ___do___ | 1-(3'-chloro)-phenyl-3-methyl-5-pyrazolone. | Do. |
| 29 | ___do___ | 1-(2'-hydroxy-3'-carboxy)-phenylazo-2-phenylamino-5-hydroxynaphthalene-7.5'-disulfonic acid. | 1-acetoacetylaminobenzene-3-sulfonic acid amide. | Do. |
| 30 | ___do___ | 1-(2'-hydroxy-3'-carboxy)-phenylazo-2-phenylamino-5-hydroxynaphthalene-7.5'-sulfonic acid. | 1-acetoacetylaminonaphthalene. | Do. |
| 31 | ___do___ | 1-(2'-hydroxy-3'-carboxy-5'-nitro)-phenylazo-2-phenylamino-5-hydroxynaphthalene-7-sulfonic acid. | 2-acetoacetylaminonaphthalene. | Do. |
| 32 | ___do___ | ___do___ | 1-acetoacetylamino-3-chlorobenzene. | Do. |
| 33 | ___do___ | 1-(2'-hydroxy-3'-carboxy-5'-sulfo)-phenylazo-2-(3'-methoxy)-propylamino-5-hydroxynaphthalene-7-sulfonic acid. | 1-(4'-methyl)-phenyl-3-methyl-5-pyrazolone. | Do. |
| 34 | ___do___ | 1-(2'-hydroxy-3'-carboxy-5'-nitro)-phenylazo-2-phenylamino-5-hydroxynaphthalene-7-sulfonic acid. | 4-acetoacetylamino-1.1'-azobenzene-3.4'-disulfonic acid. | Do. |
| 35 | 4.4'-diamino-3.3'-dicarboxymethoxy-1.1'-diphenyl. | 1-(2'-hydroxy-3'-carboxy)-phenylazo-2-phenylamino-5-hydroxynaphthalene-7.5'-disulfonic acid. | 1-acetylamino-8-hydroxynaphthalene-4-sulfonic acid. | Grey. |
| 36 | ___do___ | ___do___ | 1-phenylamino-5-hydroxynaphthalene-7-sulfonic acid. | Do. |
| 37 | 4.4'-diamino-3.3'-dimethoxy-1.1'-diphenyl. | ___do___ | 1-(2'-hydroxy-5'-sulfamido)-phenylazo-2-phenylamino-5-hydroxynaphthalene-7-sulfonic acid. | Navy blue. |
| 38 | ___do___ | 1-(2'-hydroxy-3'-carboxy-5'-chloro)-phenylazo-2-(4'-sulfo)-phenylamino-5-hydroxynaphthalene-7-sulfonic acid. | 1-acetoacetylamino-4-methylbenzene. | Black. |

The following are formulae of representative products of the foregoing examples:

EXAMPLE 5

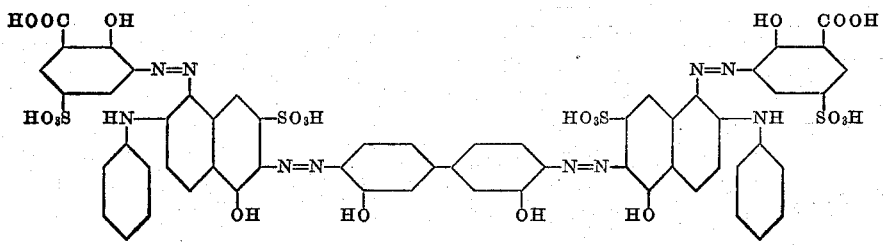

EXAMPLE 8

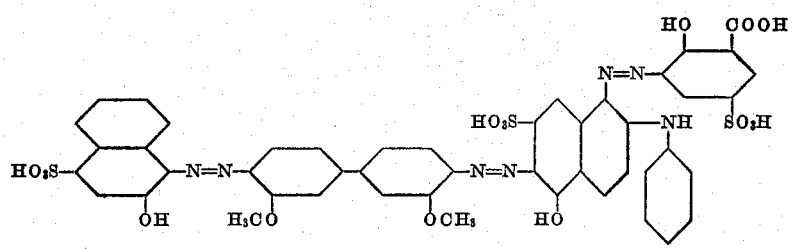

EXAMPLE 31

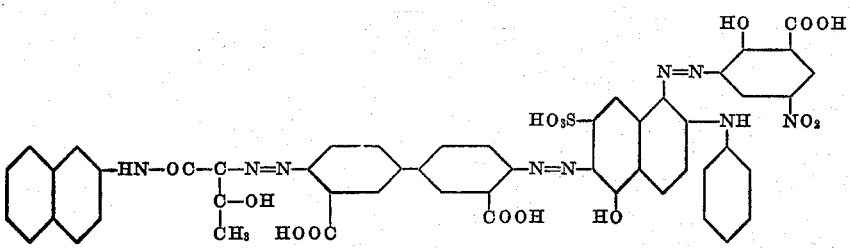

EXAMPLE 39

10 parts of wetted-out cotton are entered into 300 parts of water at 40°. The bath is then prepared with a concentrated aqueous solution of 0.6 part of the dyestuff obtainable according to Example 1, and raised to the boil in 30 minutes, during which time 3 parts of sodium sulfate in the form of a concentrated aqueous solution are added in small portions. The dye liquor is maintained at the boil for a further 30 minutes, then 1 part of sodium sulfate is added and the bath allowed to cool slowly to 40°. The material is rinsed well and treated for 30 minutes in a fresh bath at 70° containing 300 parts of water, 0.3 part of acetic acid and 0.3 part of copper sulfate. The metallized dyeing thus obtained is rinsed and dried.

In place of the 0.3 part of copper sulfate in the aftertreating bath, 0.3 part of a copper complex compound of the condensation product of diethylene triamine and dicyanodiamide (obtainable by the process described in U. S. Patent No. 2,622,075) can be employed.

EXAMPLE 40

15 parts of the dyestuff described in Example 1 are boiled with 100 parts of urea and 45 parts of triethanolamine in 360 parts of water. To the solution there are then added 400 parts of tragacanth 6%, 20 parts of sodium phosphate, 40 parts of an anionic wetting agent and 10 parts of an antifoaming agent. A fabric of viscose rayon is printed with this printing paste; the printed fabric is dried, steamed for 45–60 minutes and rinsed. After a 15 minute after treatment at 60° with 1 g./l. of a polyalkylene polyamine preparation containing copper salt, the print is rinsed again and dried.

What I claim is:
1. A polyazo dyestuff which corresponds to the formula

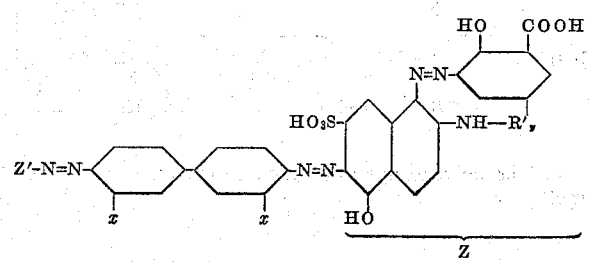

wherein $x$ stands for a member selected from the group consisting of —OH, —OCH$_3$, —OC$_2$H$_5$, —OCH$_2$.COOH and —COOH, $y$ stands for a member selected from the group consisting of hydrogen, —SO$_3$H, —SO$_2$.CH$_3$,

—SO$_2$.NH$_2$ and nitro, R' stands for a member selected from the group consisting of lower alkyl, lower hydroxyalkyl, lower alkoxyalkyl, cycloalkyl, aralkyl and mononuclear aryl radicals, and wherein Z' is a radical of a coupling component selected from the group consisting of a radical Z, of a radical of the hydroxynaphthalene series different from Z and of a radical of the hydroxybenzene, pyrazolone, acetoacetylaminobenzene and acetoacetylaminonaphthalene series.

2. The polyazo dyestuff which corresponds to the formula

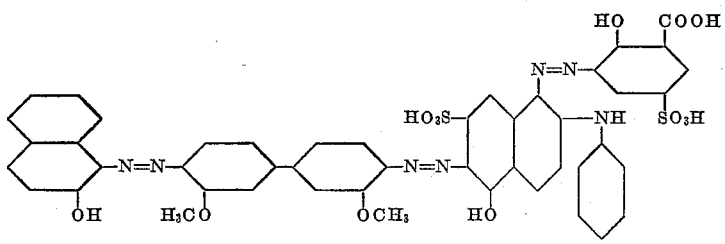

3. The polyazo dyestuff which corresponds to the formula

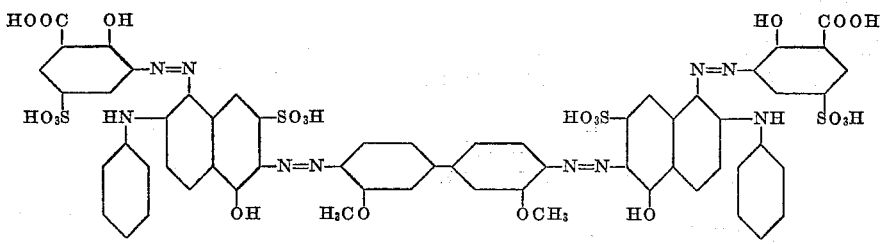

4. The polyazo dyestuff which corresponds to the formula

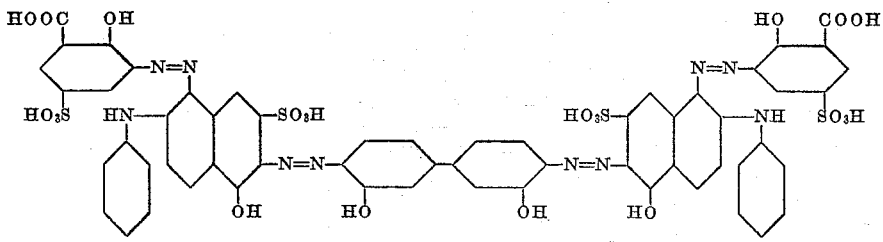

5. The polyazo dyestuff which corresponds to the formula

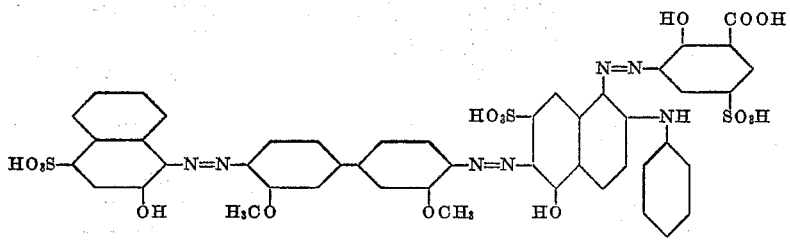

6. The polyazo dyestuff which corresponds to the formula

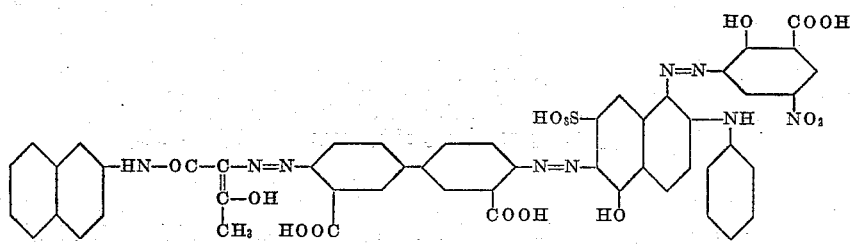

References Cited in the file of this patent
UNITED STATES PATENTS

| | | |
|---|---|---|
| 2,507,754 | Bossard et al. | May 16, 1950 |
| 2,638,468 | Wehrli | May 12, 1953 |
| 2,710,859 | Kehrer et al. | June 14, 1955 |